US011461794B2

(12) United States Patent
Matveev et al.

(10) Patent No.: US 11,461,794 B2
(45) Date of Patent: Oct. 4, 2022

(54) METHOD AND SYSTEM FOR VERIFYING ACCURACY OF INFORMATION ASSOCIATED WITH DIGITAL ITEM

(71) Applicant: YANDEX.MARKET LLC, Moscow (RU)

(72) Inventors: Vasily Mikhailovich Matveev, Moscow (RU); Mikhail Alekseevich Morozov, Moscow (RU); Dmitry Dmitrievich Korchagin, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 238 days.

(21) Appl. No.: 16/776,144

(22) Filed: Jan. 29, 2020

(65) Prior Publication Data
US 2020/0265448 A1    Aug. 20, 2020

(30) Foreign Application Priority Data

Feb. 15, 2019    (RU) .................. 2019104315

(51) Int. Cl.
*G06Q 30/02*    (2012.01)
(52) U.S. Cl.
CPC ................ *G06Q 30/0201* (2013.01)
(58) Field of Classification Search
USPC ....................................................... 705/7.29
See application file for complete search history.

(56) References Cited

U.S. PATENT DOCUMENTS

| 8,392,499 B2 | 3/2013 | Cherkasova et al. |
| 8,438,080 B1 * | 5/2013 | Xiao ............ G06Q 30/0641 705/26.1 |
| 8,548,878 B1 * | 10/2013 | Graham ............ G06K 9/6218 705/27.2 |

(Continued)

FOREIGN PATENT DOCUMENTS

| RU | 2673010 C1 | 11/2018 |
| WO | 2018027737 A1 | 2/2018 |

OTHER PUBLICATIONS

Degeratu et al., Consumer Choice Behavior in Online and Traditional Supermarkets: The Effects of Brand Name, Price, and Other Search Attributes, 2000, Elsevier, International Journal of Research Marketing (Year: 2000).*

(Continued)

*Primary Examiner* — Timothy Padot
*Assistant Examiner* — Allison M Neal
(74) *Attorney, Agent, or Firm* — BCF LLP

(57) ABSTRACT

A method and server for verifying accuracy of information associated with a digital item. The method includes monitoring user interactions between the plurality of users and a digital item group, receiving an indication of a new value for an item-characteristic associated with a given digital item having been previously provided with an old value, determining a difference between: (i) user interactions of users with the digital items from the digital item group having the old value for the item-characteristic, and (ii) user interactions of users with the digital items from the digital item group having the new value for the item-characteristic, and comparing the difference with a threshold value for determining whether the new value is accurate.

18 Claims, 5 Drawing Sheets

(56) References Cited

U.S. PATENT DOCUMENTS

| | | | |
|---|---|---|---|
| 8,655,737 B1* | 2/2014 | Tromble | G06Q 30/00 705/26.1 |
| 9,741,039 B2 | 8/2017 | Abbas | |
| 10,762,511 B1* | 9/2020 | Pope | G06Q 30/014 |
| 2007/0288433 A1* | 12/2007 | Gupta | G06F 16/3334 |
| 2008/0183718 A1 | 7/2008 | Singh et al. | |
| 2008/0189281 A1 | 8/2008 | Cancel et al. | |
| 2014/0379428 A1 | 12/2014 | Phansalkar et al. | |
| 2015/0058108 A1 | 2/2015 | Winters et al. | |
| 2015/0081790 A1 | 3/2015 | Ogawa | |
| 2018/0367560 A1 | 12/2018 | Mahaffey et al. | |

OTHER PUBLICATIONS

Fawcett "Adaptive Fraud Detection", NYNEX Science and Technology, 400 Westchester Avenue, White Plains, New York 10604, Jan. 1997 •https://doi.org/10.1023/A:1009700419189.

Russian Search Report dated Feb. 17, 2021 issued in respect of the counterpart Russian Patent Application No. RU2019104315.

* cited by examiner

METHOD AND SYSTEM FOR VERIFYING ACCURACY OF INFORMATION ASSOCIATED WITH DIGITAL ITEM

FIELD

The present technology relates to computer-implemented methods for verifying digital information, and specifically to methods and systems for verifying accuracy of information associated with digital items.

BACKGROUND

Various global or local communication networks (the Internet, the World Wide Web, local area networks and the like) offer users a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Online ecommerce platforms are accessible over such communication networks. Typically, a large number of digital items are made available on such platforms that are representative of objects that may be of interest to users. Put another way, ecommerce platforms offer buyers and sellers the possibility of finding and providing a variety of objects (such as products, services, and/or other goods) that can be otherwise inconvenient to find in conventional stores or in other online storefronts. In addition, they offer object providers a potentially larger pool of users for promotional and commercial purposes.

Information regarding digital items made available on an ecommerce platform, such as prices for example, may not be fixed and can be updated by object providers in order to influence the interest level of users in their objects. As such, users have the incentive of being able to obtain some objects (represented by respective digital items) at significant discounts.

However, provision of erroneous and/or inaccurate information regarding digital items may be detrimental for the object providers, as well as for the operator of the ecommerce platform as it can affect the confidence level of users in the object providers and/or in the ecommerce platform.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

In a first broad aspect of the present technology, there is provided a method of verifying accuracy of information associated with a digital item. Information about digital items is provided to an e-platform by a plurality of network resources. The e-platform has a plurality of users and the digital items are representative of objects provideable to the plurality of users. The e-platform is hosted on a server. The method is executable by the server. The method comprises monitoring, by the server, user interactions between the plurality of users and a digital item group. The digital item group includes digital items representative of same objects and provided to the e-platform by more than one network resources. The method comprises receiving, by the server from a given network resource from the more than one network resources, an indication of a new value for an item-characteristic associated with a given digital item. The given digital item has been previously provided by the given network resource to the e-platform with an old value of the item-characteristic. The given digital item is part of the digital item group. The new value is for replacing the old value of the item-characteristic of the given digital item. The method comprises determining, by the server, a difference between: user interactions of users with the digital items from the digital item group having the old value for the item-characteristic, and user interactions of users with the digital items from the digital item group having the new value for the item-characteristic. The method comprises comparing, by the server, the difference with a threshold value for determining whether the new value of the item-characteristic for the given digital item is accurate.

In some embodiments of the method, the method further comprises identifying, by the server, the digital items that are to be included in the digital item group.

In some embodiments of the method, the identifying comprises applying, by the server, a masking algorithm on values of at least one item-characteristic of digital items.

In some embodiments of the method, the applying the masking algorithm comprises comparing, by the server, values of the at least one item-characteristic of digital items.

In some embodiments of the method, the applying the masking algorithm comprises identifying, by the server, a set of digital items from the plurality of digital items that have same values of the at least one item-characteristic of digital items. The set of digital items is to be included in the digital item group.

In some embodiments of the method, the at least one item-characteristic is a name of digital item.

In some embodiments of the method, the user interactions are of a given type of user interactions.

In some embodiments of the method, the user interactions between users and digital items are a number of clicks performed by users on digital items.

In some embodiments of the method, the user interactions between users and digital items are the number of clicks performed by users on digital items within a pre-determined time interval.

In some embodiments of the method, the item-characteristic is a price of digital item.

In some embodiments of the method, a given object is one of a product and a service for sale.

In some embodiments of the method, the method further comprises, in response to the difference being below the threshold value, determining that the new value of the item-characteristic received from the given network resource for the given digital item is accurate.

In some embodiments of the method, the method further comprises, in response to the difference being above the threshold value, determining that the new value of the item-characteristic received from the given network resource for the given digital item is not accurate.

In some embodiments of the method, the threshold value is an interval of values, and where the method further comprises, in response to the difference being within the interval of values, determining that the new value of the item-characteristic received from the given network resource for the given digital item is accurate.

In a second broad aspect of the present technology, there is provided a server for verifying accuracy of information associated with a digital item. Information about digital items provided to an e-platform by a plurality of network resources. The e-platform has a plurality of users. The digital items are representative of objects provideable to the plurality of users. The e-platform is hosted on the server. The server is configured to monitor user interactions between the plurality of users and a digital item group. The digital item group including digital items representative of same objects and provided to the e-platform by more than one network resources. The server is configured to receive, from a given network resource from the more than one network resources, an indication of a new value for an item-characteristic associated with a given digital item. The given digital item has been previously provided by the given network resource to the e-platform with an old value of the item-characteristic. The given digital item is part of the digital item group. The new value is for replacing the old value of the item-characteristic of the given digital item. The server is configured to determine a difference between: user interactions of users with the digital items from the digital item group having the old value for the item-characteristic, and user interactions of users with the digital items from the digital item group having the new value for the item-characteristic. The server is configured to compare the difference with a threshold value for determining whether the new value of the item-characteristic for the given digital item is accurate.

In some embodiments of the server, the server is further configured to identify the digital items that are to be included in the digital item group.

In some embodiments of the server, to identify comprises the server configured to apply a masking algorithm on values of at least one item-characteristic of digital items.

In some embodiments of the server, to apply the masking algorithm comprises the server configured to compare values of the at least one item-characteristic of digital items.

In some embodiments of the server, to apply the masking algorithm comprises the server configured to identify a set of digital items from the plurality of digital items that have same values of the at least one item-characteristic of digital items. The set of digital items is to be included in the digital item group.

In some embodiments of the server, the at least one item-characteristic is a name of digital item.

In some embodiments of the server, the user interactions are of a given type of user interactions.

In some embodiments of the server, the user interactions between users and digital items are a number of clicks performed by users on digital items.

In some embodiments of the server, the user interactions between users and digital items are the number of clicks performed by users on digital items within a pre-determined time interval.

In some embodiments of the server, the item-characteristic is a price of digital item.

In some embodiments of the server, a given object is one of a product and a service for sale.

In some embodiments of the server, the server is further configured to, in response to the difference being below the threshold value, determine that the new value of the item-characteristic received from the given network resource for the given digital item is accurate.

In some embodiments of the server, the server is further configured to, in response to the difference being above the threshold value, determine that the new value of the item-characteristic received from the given network resource for the given digital item is not accurate.

In some embodiments of the server, the threshold value is an interval of values, and where the server is further configured to, in response to the difference being within the interval of values, determine that the new value of the item-characteristic received from the given network resource for the given digital item is accurate.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
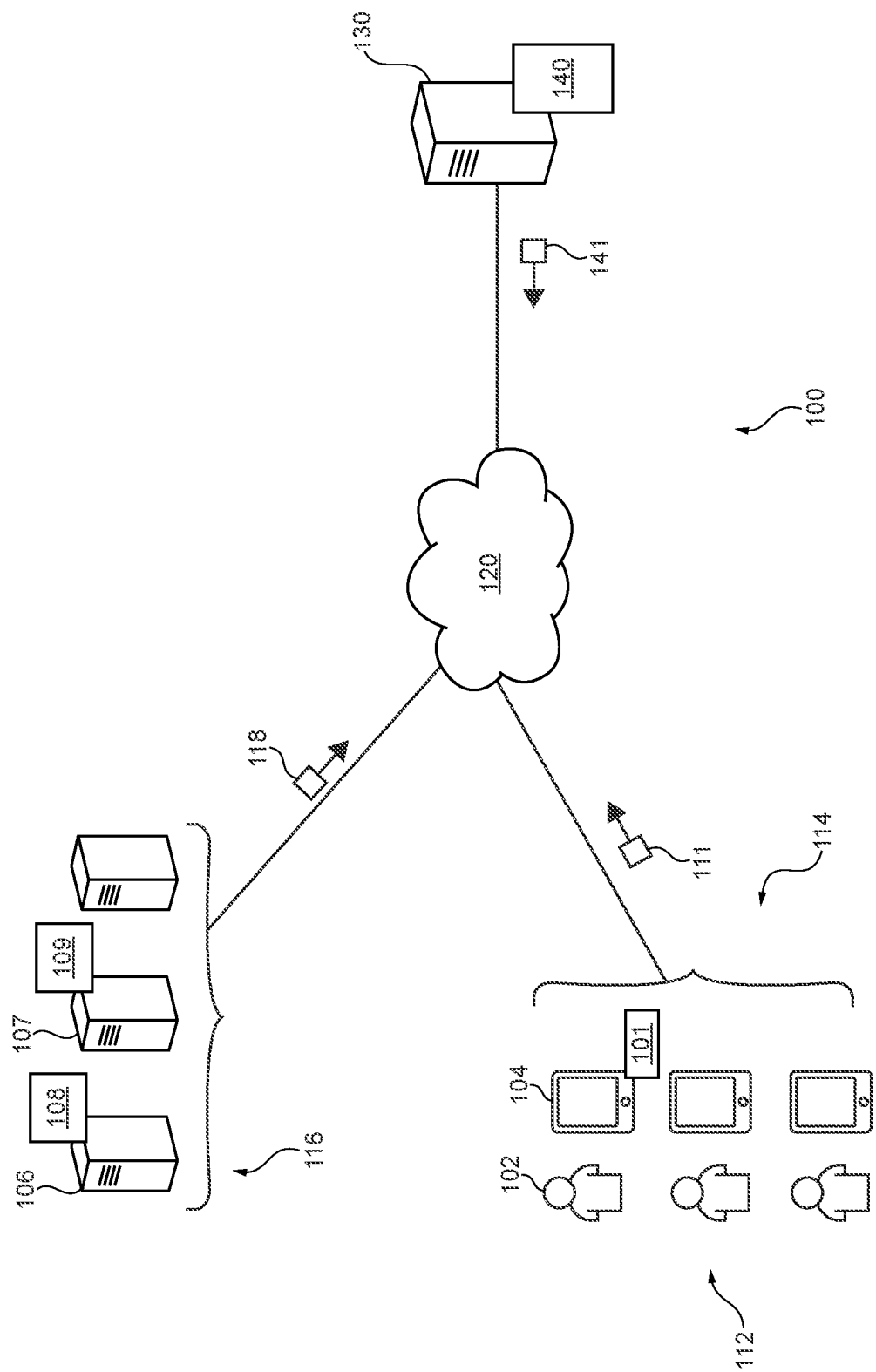
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 is configured to host and allow access to an "electronic market platform". Broadly speaking, an electronic market platform provides users with access to a plurality of digital items. Information about these digital items can be made available on the electronic market platform by network resources. These network resources may be operated by object providers that may want to provide, promote and/or offer to sell, for example, objects to the users of the electronic market platform.

To better illustrate this, let it be assumed that a given object provider desires to provide, promote and/or offer for sale objects (such as products, services, and/or other goods, for example) to users of the electronic market platform. As such, this object provider may operate a network resource (e.g., one or more servers) that is configured to provide the electronic market platform with information about these objects in a digital format—that is, the network resource may provide information about digital items that are representative of respective objects being provided, promoted and/or offered for sale. This may allow the users to navigate through, compare, and select digital items representative of objects that are of interest to them.

As illustrated in FIG. 1, a user 102 (a given one of a plurality of users 112) may be a subscriber to an electronic market platform 140, or simply an "e-platform" 140, provided by the system 100. The e-platform 140 is hosted by a server 130 and, as explained above, may allow the user 102 to navigate through, compare and select a number of digital items. Some non-limiting examples of the e-platform 140 may include, but not limited to: eBay™ platform, Alibaba™ platform, Yandex.Market™ platform, and the like.

The subscription of the user 102 to the e-platform 140 does not need to be explicit or paid for. For example, the user 102 can become a subscriber by virtue of downloading an application from the server 130, by registering and provisioning a log-in/password combination, by registering and provisioning user preferences and the like. As such, any system variation configured to allow users to navigate through, compare, and/or select digital items can be adapted to execute embodiments of the present technology, once teachings presented herein are appreciated.

How various components of the system 100 are configured to perform at least some functionalities of the present technology will now be described in greater detail.

Electronic Device

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

As depicted in FIG. 1, it should be noted that the system 100 also comprises additional electronic devices to the electronic device 104 associated with the user 102. Put another way, it is contemplated that the system 100 may comprise a plurality of electronic devices 114 associated with the plurality of users 112. Although the plurality of electronic device 114 is depicted as including three electronic devices, and that the plurality of users 112 is depicted as including three users, it should be understood that the plurality of electronic device 114 may comprise more than (or fewer than) three electronic devices and that the plurality of users 112 may comprise more than (or fewer than) three users, without departing from the scope of the present technology.

The implementation of the electronic device 104 (and of other ones of the plurality of electronic devices 114) is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute an e-platform application 101. Generally speaking, the purpose of the e-platform application 101 is to enable the user 102 to receive (or otherwise access) content provided by the e-platform 140, as will be described in greater detail herein further below.

How the e-platform application 101 is implemented is not particularly limited. One example of the e-platform application 101 may include the user 102 accessing a web site associated with the e-platform 140 to access the e-platform application 101. For example, the e-platform application 101 may be accessed by typing in (or otherwise copy-pasting or selecting a link) an URL associated with the e-platform 140.

Alternatively, the e-platform application 101 may be an application downloaded from a so-called "app store", such as APPSTORE™ or GOOGLEPLAY™ and installed/executed on the electronic device 104. It should be expressly understood that the e-platform application 101 may be accessed using any other suitable means. In yet additional embodiments, the e-platform application 101 functionality may be incorporated into another application, such as a browser application (not depicted) or the like. For example, the e-platform application 101 may be executed as part of the browser application—for example, when the user 102 starts the browser application, the functionality of the e-platform application 101 may be executed.

The user 102 may make use of the e-platform application 101 for providing the server 130 of the e-platform 140 with information about objects that are potentially of interest to the user 102. This information may take form of a query and may be used by the server 130 for filtering digital items (representative of objects) that are available on the e-platform 140 and/or for searching for a specific digital item.

For example, in response to the user 102 providing a query via the e-platform application 101, the electronic device 104 may be configured to generate a request data packet 111. The request data packet 111 may comprise inter alia data indicative of the query and may be transmitted to the server 130 hosting the e-platform 140.

Furthermore, the electronic device 104 may also be configured to receive a response data packet 141 from the server 130. The response data packet 141 may comprise inter alia data indicative of search results responsive to the query submitted by the user 102. The search results, in this case, may be indicative of respective digital items representative of objects that are potentially of interest to the user 102.

Figure 2:
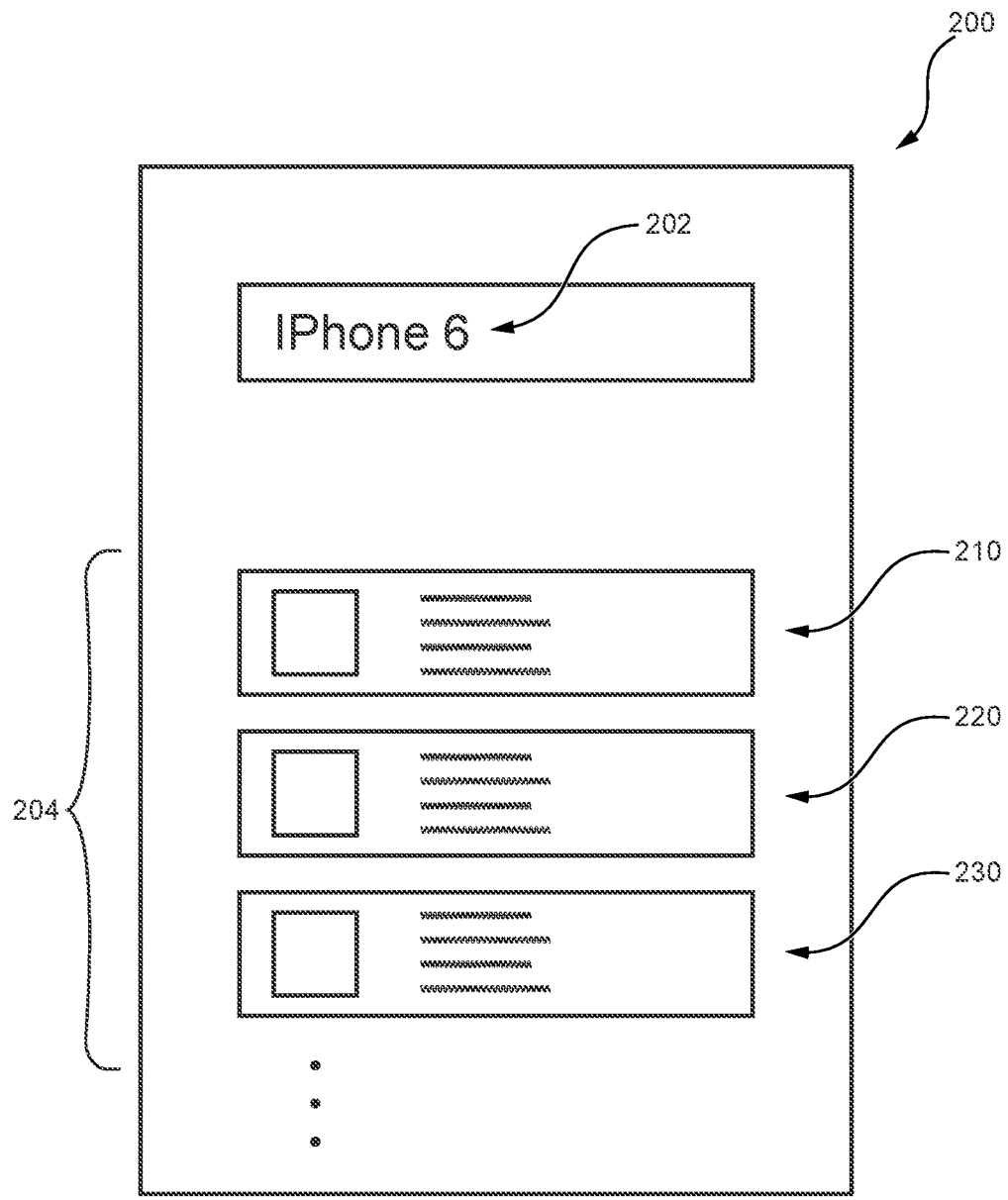
FIG. 2 depicts a representation of an e-platform application displayed to a user of FIG. 1 in accordance with non-limiting embodiments of the present technology.

To better illustrate this, reference will now be made to FIG. 2 that depicts a representation 200 of the e-platform application 101 as displayed to the user 102 on the electronic device 104, in accordance with a non-limiting example of the present technology, following the receipt of the response data packet 141.

For example, the representation 200 contains a query 202 "IPhone 6" provided by the user 102. The query 202 includes information about an object that is potentially of interest for the user 102. Also, the representation 200 contains a plurality of search results 204 that are responsive to the query 202. The plurality of search results 204 comprises a first search result 210, a second search result 220 and a third search result 230. In this case, the plurality of results 204 is indicative of respective digital items that are made available on the e-platform 140.

How digital items are implemented in the context of the present technology and how digital items are made available on the e-platform 140 will be described in greater details herein further below.

Nevertheless, it should be noted that the user 102 may select a given search result from the plurality of search results 204 in order to, for example, appreciate additional information about the digital item associated with the given search result. Therefore, it can be said that users from the plurality of users 112 of the e-platform 140 can interact with digital items made available on the e-platform 140. Different types of user interactions between users and digital items will be described in greater details herein further below.

Communication Network

The electronic device 104 (as well as other ones of the plurality of electronic devices 114) is communicatively coupled to a communication network 120 for accessing the server 130.

In some non-limiting embodiments of the present technology, the communication network 120 may be implemented as the Internet. In other embodiments of the present technology, the communication network 120 can be implemented differently, such as any wide-area communication network, local-area communication network, a private communication network and the like.

How a communication link (not separately numbered) between the electronic device 104 and the communication network 120 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Plurality of Network Resources

A plurality of network resources 116 comprising inter alia a first network resource 106 and a second network resource 107 is also communicatively coupled to the communication network 120. The server 130 is accessible by the first network resource 106 and by the second network resource 107. For example, the first network resource 106 may be configured to access the server 130 in order make respective digital items available on the e-platform 140.

It can be said that a given network resource is operated by a respective object provider and may be used to provide information about respective objects in a form of digital items to the e-platform 140. For example, the first network resource 106 is operated by a first object provider 108 while the second network resource 107 is operated by a second object provider 109. In this example, the first network resource 106 is used by the first object provider 108 to provide information about objects of the first object provider 108 in a form of respective digital items to the e-platform 140. Also in this example, the second network resource 107 is used by the second object provider 109 to provide information about objects of the second object provider 109 in a form of respective digital items to the e-platform 140.

To better illustrate this, let it be assumed that the first object provider 108 is a given electronic retail store. As such, the first network resource 106 may take form of one or more servers that is operated by the given electronic retail store and is configured to provide information indicative of digital items that are representative of products, services and/or other goods of the given electronic retail store.

Let it be assumed that a first given object of the given electronic retail store is a MacBook™ Pro laptop computer, while a second given object of the given electronic retail store is an iPhone™ 6 smartphone. As such, the first network resource 106 may provide information about the MacBook™ Pro laptop computer in a form of a first given digital item, and about the iPhone™ 6 smartphone in a form of a second given digital item.

Information indicative of a given digital item that the given network resource may provide to the e-platform 140 is not particularly limited. However, it should be noted that a given digital item is associated with item-characteristics. In one non-limiting example, item-characteristics associated with a given digital item may be, but not limited to:
  name;
  price;
  weight;
  height;
  length;
  memory size;
  connectivity; and
  the like.

As such, information about a given digital item may comprise values of item-characteristics of the given digital item. For example, information about a given digital item may comprise a value of "iPhone 6s" for the name item-characteristic of the given digital item. In another example, information about a given digital item may comprise a value of "600" for the price item-characteristic of the given digital item.

Therefore, it can be said that in some embodiments of the present technology, information about a given digital item may be provided to the e-platform 140 in a "value/item-characteristic" format such that the information is indicative of (i) various item-characteristics associated with the given digital item as well as (ii) the respective values.

In some embodiments of the present technology, it is contemplated that the first network resource 106 may be configured to generate an item data packet 118 and may transmit the item data packet 118 to the server 130. The item data packet 118 may comprise inter alia information about one or more digital items that the object provider 108 is desirous of making available on the e-platform 140. For example, the item data packet 118 may comprise information about item-characteristics and respective values associated with the one or more digital items.

As mentioned above, the first network resource 106 may also be configured to update information about digital items that have already been made available on the e-platform 140. For example, when the object provider 108 is desirous of changing a value associated with a respective item-characteristic of a given digital item (e.g., the value of the price item-characteristic of a given digital item), the first network resource 106 may be configured to provide updated information about the given digital item to the server 130 in order to change an old (outdated) value of a given item-characteristic by a new (updated) value of the given item-characteristic.

It is contemplated that, when a value of an item-characteristic of a given digital item is to be updated, the first network resource 106 may generate the item data packet 118 comprising data indicative of the new (updated) value of the item-characteristic of that given digital item so that the old (outdated) value of the item-characteristic of that digital item is changed on the e-platform 140.

How information about digital items provided by the plurality of network resources 116 is used by the server 130 hosting the e-platform 140 will be described in greater details herein further below.

Server

The server 130 may be implemented as a conventional computer server. In an example of an embodiment of the present technology, the server 130 may be implemented as a Dell™ PowerEdge™ Server running the Microsoft™ Windows Server™ operating system. Needless to say, the server 130 may be implemented in any other suitable hardware, software, and/or firmware, or a combination thereof. In the depicted non-limiting embodiments of the present technology, the server 130 is a single server. In alternative non-limiting embodiments of the present technology, the functionality of the server 112 may be distributed and may be implemented via multiple servers.

As previously mentioned, the server 130 is configured to host the e-platform 140. Generally speaking, the server 130 is configured to (i) receive data indicative of a plurality of digital items from the plurality of network resources 116 and (ii) provide at least some of this data to the plurality of users 112 so that they can select digital item(s) representative of objects that are of interest to them.

It is contemplated that the server 130 is also configured to monitor user interactions between the plurality of users 112 and the digital items made available on the e-platform 140. Put another way, the server 130 may be configured to keep track, record and store data (in a local and/or remote storage communicatively coupled to the server 130, for example) indicative of user interactions with digital items. Types of user interactions with digital items that the server 130 may keep track of, record, and store may include, but are not limited to:
  number of clicks on the given digital item;
  number of long clicks on the given digital item;
  number of "likes" for the given digital item;
  number of "dislikes" for the given digital item;
  number of "shares" of the given digital item;
  amount of time spent interacting with the digital item;
  number of times the digital item has been purchased; and
  the like.

In some embodiments, it is contemplated that the server 130 may be configured to monitor user interactions between users and digital items on an item-by-item basis. This means that the server 130 may be configured to monitor user interactions for each digital item individually.

In other embodiments, it is contemplated that the server may also be configured to monitor user interactions between users and digital items in a grouped manner, as opposed to monitoring them on an item-by-item basis. That is, the server 130 may be configured to monitor user interactions between users and digital items that are part of a "digital item group". In the context of the present technology, a given digital item group includes digital items representative of same objects and provided to the e-platform 140 by more than one network resources.

To better illustrate this, let it be assumed that a first given digital item is provided to the e-platform 140 by the first network resource 106 operated by the first object provider 106 and a second given digital item is provided to the e-platform 140 by the second network resource 107 operated by the second object provider 109. Let is also be assumed that the first given digital item is representative of an iPhone™ 6s smartphone and that the second given digital item is also representative of an iPhone™ 6s smartphone. This means that the first object provider 108 and the second object provider 109 may be desirous of providing, promoting and/or offering for sale iPhone™ 6s smartphones by means of the first given digital item and the second given digital item, respectively, which are made available on the e-platform 140.

In the above example, the first given digital item and the second given digital item may be part of a given digital item group since they are both representative of the same objects (iPhone™ 6s smartphones) and are provided by more than one network resources (by the first network resource 106 and the second network resource 109, respectively).

As such, in the above example, the server 130 may be configured to monitor user interactions between users and digital items that are representative of iPhone™ 6s smartphones—that is, the server 130 may be configured to monitor user interactions with the first given digital item, the second given digital item and other potential digital items that are made available on the e-platform 140 and that are representative of iPhone™ 6s smartphones.

In some embodiments of the present technology, the server 130 may be configured to identify digital items that are to be included in a given digital item group. It is contemplated that the server 130 may be configured to determine one or more digital item groups amongst the plurality of digital items that are made available on the e-platform 140. It is also contemplated that the server 130 may be configured to group at least some of the plurality of digital items made available on the e-platform 140 into one or more digital item groups.

It is contemplated that the server 130 may be configured to identify digital items that are to be included in a given digital item group by applying a masking algorithm (not depicted) on values of at least one item-characteristic of digital items.

To better illustrate this, reference will now be made to FIG. 3 that depicts a first set of digital items 310 and a second set of digital items 320. Let it be assumed that the first set of digital items 310 is provided to the server 130 by the first network resource 106, while the second set of digital items 320 is provided to the server 130 by the second network resource 107. The first set of digital items 310 comprises a first digital item 302 and a second digital item 304, while the second set of digital items 320 comprises a third digital item 306 and a fourth digital item 308.

Figure 3:
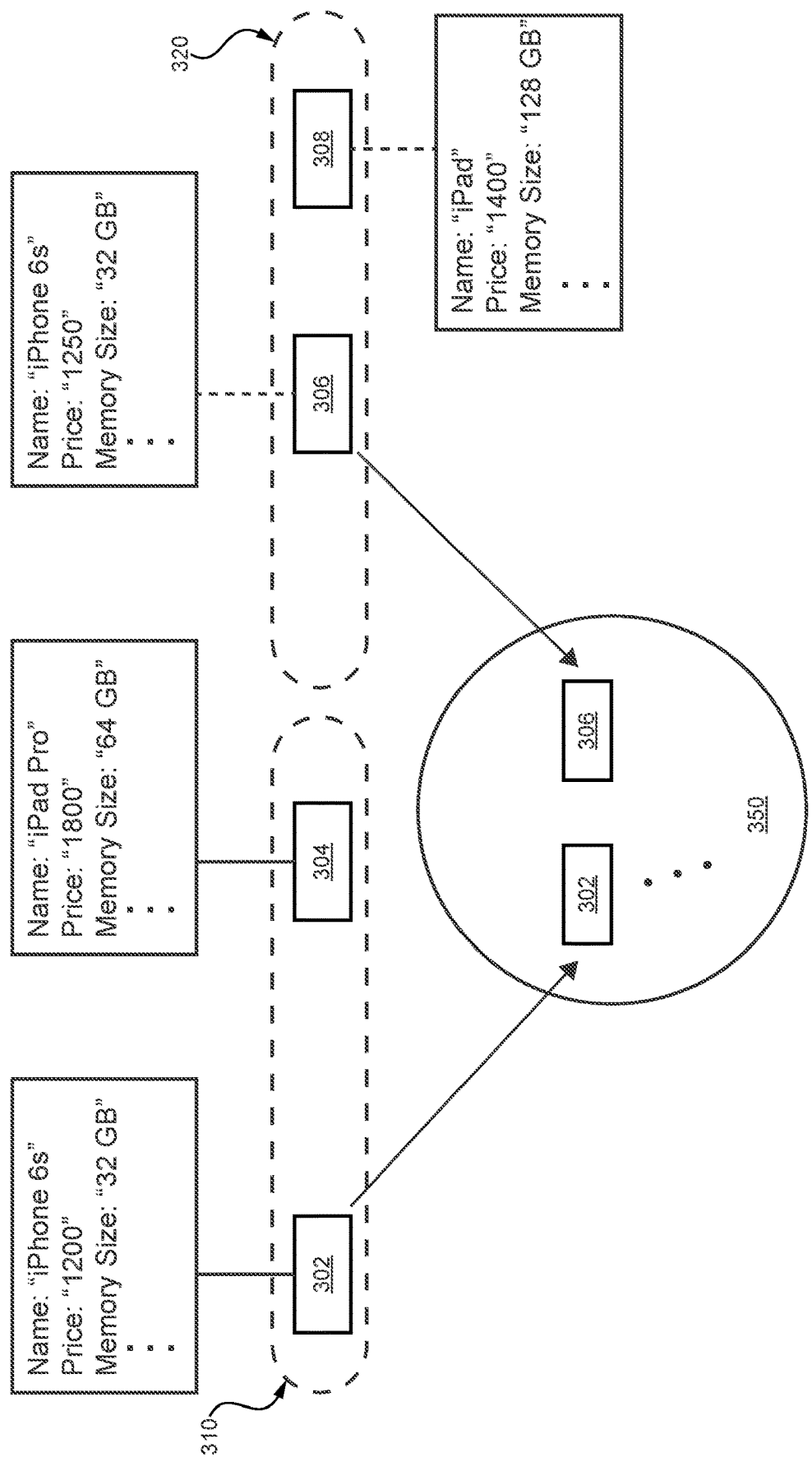
FIG. 3 depicts sets of digital items and a digital item group in accordance with non-limiting embodiments of the present technology.

As it can be seen in FIG. 3, the first digital item 302, the second digital item 304, the third digital item 306 and the fourth digital item 308 have item-characteristics such as inter alia (i) the name item-characteristic, (ii) the price item-characteristic and (iii) the memory size item-characteristic. As such, the server 130 may be configured to apply the masking algorithm on values of at least one of the above-listed item-characteristics of the first digital item 302, the second digital item 304, the third digital item 306 and the fourth digital item 308.

In one non-limiting example of the present technology, the server 130 may be configured to apply the masking algorithm on values of the name item-characteristic. In this example, the server 130 may be configured to apply the masking algorithm onto (i) "iPhone 6s" value of the name item-characteristic of the first digital item 302, (ii) "iPad Pro" value of the name item-characteristic of the second digital item 304, (iii) "iPhone 6s" value of the name item-characteristic of the third digital item 306, and (iv) "iPad" value of the name item-characteristic of the fourth digital item 308.

In some embodiments, the server 130 may be configured to apply the masking algorithm onto the values of a given item-characteristic in order to compare these values amongst different digital items. This means that in this case, the server 130 may be configured to compare the values "iPhone 6s", "iPad Pro", "iPhone 6s", and "iPad".

As a result of this comparison, the server 130 may determine that the values of the name item-characteristic of the first digital item 302 and of the third digital item 306 are the same (exact match, for example). Put another way, the server 130 may be configured to identify the first digital item 302 and the third digital item 306 as having the same values associated with the name item-characteristic and, therefore in some embodiments, may include them to a common digital item group, such as a digital item group 350.

It is contemplated that, in other embodiments of the present technology, the server 130 may determine that values of a given item-characteristic of digital items are the same, without having an exact match of the values. For example, the server 130 may determine that the values of the name item-characteristic of the digital items are the same if these values have one or less unmatched characters. Put another way, in a non-limiting example of the present technology, the server 130 may determine that values of a given item-characteristic of digital items are the same even if these values only partially match each other.

It should be noted that the server 130 may be configured to compare values of more than one item-characteristic to determine whether or not digital items have the same values for the more than one item-characteristics. For example, in addition to comparing values of the name item-characteristic as explained above, the server 130 may be configured to compare values of the memory size item-characteristic. In this example, if values of the name item-characteristic are the same values and if values of the memory size item-characteristic are the same values, the server 120 may be configured to add the respective digital items into a common digital item group.

It is contemplated that the server 130 may be configured to apply the masking algorithm for a large number of digital items made available on the e-platform 140 and, as such, may be configured to determine a plurality of digital item groups, similarly to how the server 130 is configured to determine the digital item group 350.

As previously alluded to, the server 130 may be configured to monitor user interactions between users and digital items in a grouped manner. This means that the server 130 may be configured to monitor user interactions between users and digital items in a given digital item group. For example, the server 130 may be configured to monitor user interactions between users and digital items in the digital item group 350.

Figure 4:
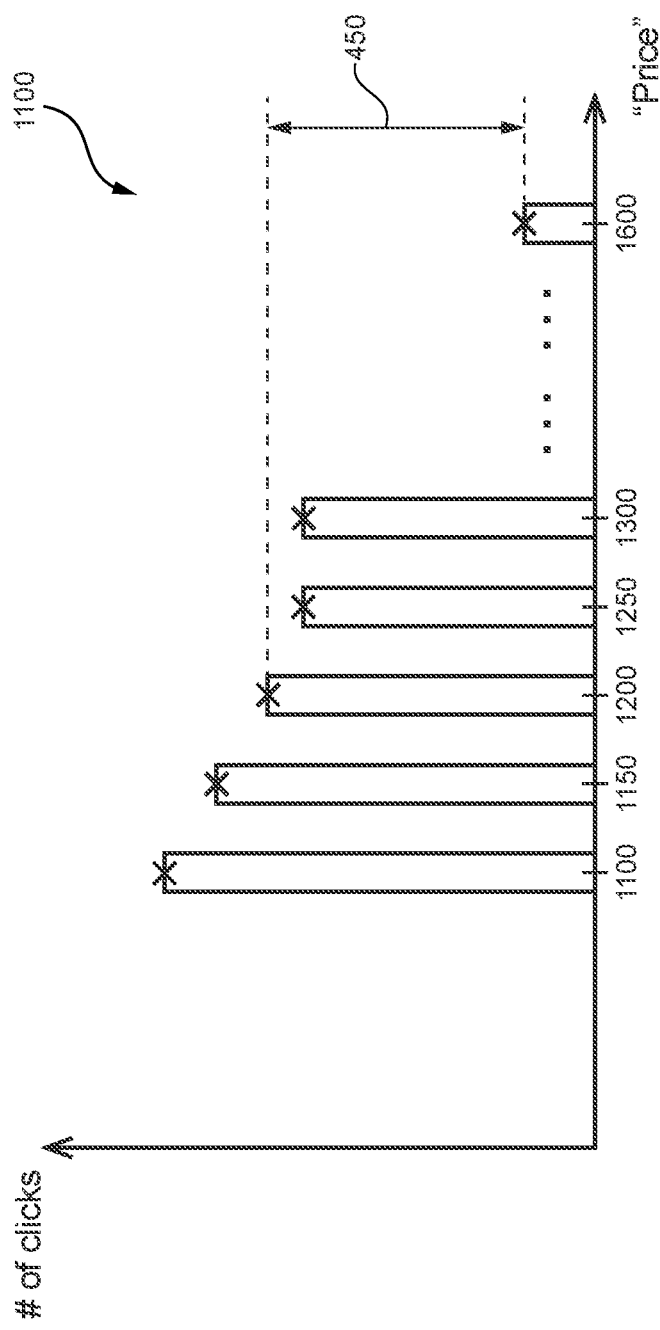
FIG. 4 depicts a given type of user interactions between users and digital items within the digital item group of FIG. 3 in accordance with non-limiting embodiments of the present technology.

With reference to FIG. 4, there is depicted a representation 400 of a given type of user interactions between users and the digital items within the digital item group 350. More particularly, representation 400 illustrates a number of clicks on digital items within the digital item group 350 as a function of the price item-characteristic of the digital items within the digital item group 350. As seen in the non-limiting example of FIG. 4, the number of clicks on digital items by users generally decreases with the value of the price item-characteristic of digital items in the digital item group 350.

Let it be assumed that, at a given moment in time, the server 120 receives from the first network resource 106 an indication of a new value of "1600" for the price item-characteristic associated with the first digital item 302 (see FIG. 3). At that given moment in time, the first digital item 302 has been previously provided by the first network resource 106 to the server 130 with a value of "1200" for the price item-characteristic. As such, at the given moment in time, it can be said that the server 130 may be configured to, in a sense, update/replace the old (outdated) value of the price item-characteristic "1200" by the new value of the price item-characteristic "1600".

In some embodiments of the present technology, the server 130 may be configured to verify the accuracy of the new value of the price item-characteristic. To that end, the server 130 may be configured to determine a difference 450 between (i) user interactions (of a given type such as number of clicks, for example) of users with the digital items from the digital item group 350 having the value "1200" for the price item-characteristic and (ii) user interactions (of a given type such as number of clicks, for example) of users with the digital items from the digital item group 350 having the value "1600" for the price item-characteristic.

Once the server 130 determines the difference 450, the server 130 may be configured to compare the difference 450 with a threshold value (not depicted) for determining whether the new value "1600" of the price item-characteristic for the first digital item 302 is accurate.

In some embodiments, the threshold value may be pre-determined by an operator of the e-platform 140 and/or of the server 130. It is contemplated that the threshold value may be pre-determined by the operator based on inter alia (i) the given item-characteristic the value of which is being updated/replaced and (ii) a given type of user interactions (e.g, number of clicks, dwell-time, number of downloads, etc.).

Some examples of how the threshold value may be pre-determined by the operator of the e-platform 140 and/or of the server 130 and how the threshold value may be expressed will now be described in turn. However, it should be noted that the threshold value may be pre-determined and expressed differently from what is exemplified herein as a person skilled in the art may understand after having appreciated the teachings disclosed herein.

In a first example, the threshold value may be pre-determined by the operator as 10% change in user interactions of a given type (such as the number of clicks, for example) of users with the digital items from the digital item group 350 having the old value "1200" for the price item-characteristic. Hence, it can be said that the threshold value may be expressed as a given proportion (in this case, 10%) of a number of clicks on digital items from the digital item group 350 having the old value "1200" for the price item-characteristic.

As such, in this first example, if the difference 450 represents more than a 10% "drop" in user interactions of a given type, the server 130 may determine that the new value of "1600" is not accurate. However, if the difference 450 represents less than a 10% "drop" in user interactions of a given type, the server 130 may determine that the new value of "1600" is accurate.

The developers of the present technology have realized that accuracy of information associated with a given digital item may be determined based on user behavior/pattern of user interactions with digital items that are representative of the same objects. Broadly speaking, the developers of the present technology have realized that if (i) users interact with digital items representative of the same objects when the price associated therewith is "X" and (ii) users interact, in comparison, significantly less with digital items representative of the same objects when the price associated therewith is "Y", then the price "Y" associated with a given digital item that is representative of the same object is likely to be erroneously and/or inaccurately provided to the e-platform 140.

In a second example, let it be assumed that the new value for the price item-characteristic of the first digital item 302 is "120" (instead of being "1600" as in the previous example). In this second example, the server 130 may be configured to determine another difference (not depicted) between (i) user interactions (of a given type such as number of clicks, for example) of users with the digital items from the digital item group 350 having the value "1200" for the price item-characteristic and (ii) user interactions (of a given type such as number of clicks, for example) of users with the digital items from the digital item group 350 having the value "120" for the price item-characteristic.

As such, in this second example, if the another difference represents more than, for example, a 1000% "spike" in user interactions of a given type, the server 130 may determine that the new value of "120" is not accurate. However, if the another difference represents less than, for example, a 1000% "increase" in user interactions of a given type, the server 130 may determine that the new value of "120" is accurate.

Broadly speaking, the developers of the present technology have realized that if (i) users interact with digital items representative of the same objects when the price associated therewith is "X" and (ii) users interact, in comparison, significantly more with digital items representative of the same objects when the price associated therewith is "Y", then the price "Y" associated with a given digital item that is representative of the same object is likely to be erroneously and/or inaccurately provided to the e-platform 140.

In a third example, the threshold value may be pre-determined by the operator of the e-platform 140 and/or of the server 130 as an interval of values ranging from −10% to +1000% of user interactions of a given type (such as the number of clicks, for example) of users with the digital items from the digital item group 350 having the old value "1200" for the price item-characteristic.

As such, in this third example, if the difference 450 is (i) less than a 10% "drop" in user interactions of the given type and (ii) less than a 1000% "spike" in user interactions of the given type, the server 130 may be configured to determine that the new value of "1600" for the price item-characteristic is accurate. Otherwise, the server 130 may be configured to determine that the new value of "1600" for the price item-characteristic is not accurate.

Figure 5:
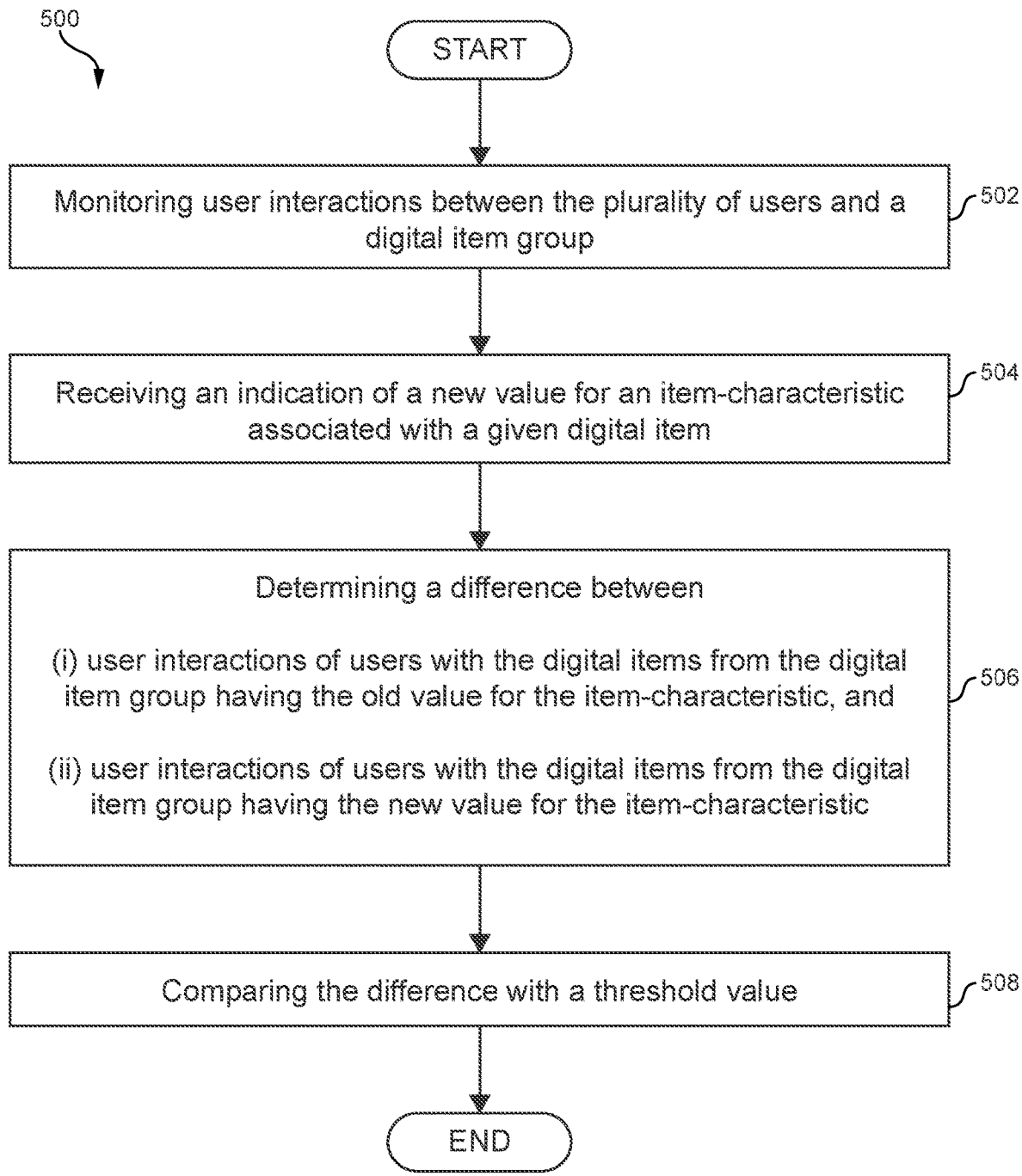
FIG. 5 depicts a block diagram of a method of verifying accuracy of information associated with a digital item, the method executable by the server of FIG. 1 in accordance with embodiments of the present technology.

With reference to FIG. 5, there is depicted a flow-chart of a method 500 of verifying accuracy of information associated with a digital item. The method 500 is executable by the server 130. Various steps of the method 500 will now be described in turn.

Step 502: Monitoring User Interactions Between the Plurality of Users and a Digital Item Group The method 500 begins at step 502 with the server 130 configured to monitor user interactions between the plurality of users 112 and a given digital item group. As mentioned above, the given digital item group includes digital items representative of same objects and provided to the e-platform 140 be more than one network resources. For example, the server 130 may be configured to monitor user interactions between the plurality of users and the digital item group 350 depicted in FIG. 3.

It is contemplated that in some embodiments of the present technology, the server 130 may be configured to identify the digital items that are to be included in the digital item group 350. For example, as explained above, the server 130 may be configured to identify a given digital item group by applying the masking algorithm on values of at least one item-characteristic of digital items.

In other embodiments of the present technology, the server 130 configured to apply the masking algorithm may also be configured to compare values of the at least one item-characteristic of digital items amongst each other. In one example, the server 130 may be configured to compare values of the at least one item-characteristic in order to determine whether there is an exact match of these values. In another example, the server 130 may be configured to compare values of the at least one item-characteristic in order to determine whether there is a partial match of these values.

It is contemplated that the server 130 configured to apply the masking algorithm may be configured to identify a set of digital items from the plurality of digital items (made available on the e-platform 140) that have same values of the at least one item-characteristic of digital items. The server 130 may be configured to determine that this set of digital items is to be included in a given digital item group.

Step 504: Receiving an Indication of a New Value for an Item-Characteristic Associated with a Given Digital Item The method 500 continues to step 504 with the server 130 configured to receive, from a given network resource from the plurality of network resources 116, an indication of a new value for an item-characteristic associated with a given digital item. For example, this given digital item may be part of the digital item group 350 and may have been previously provided by the respective network resource to the e-platform 140 with an old (outdated) value of the item-characteristic, and where the new value is for replacing the old value. In one example, the new value may be provided for the price item-characteristic of digital items.

Step 506: Determining a Difference Between (i) User Interactions of Users with the Digital Items from the Digital Item Group Having the Old Value for the Item-Characteristic, and (ii) User Interactions of Users with the Digital Items from the Digital Item Group Having the New Value for the Item-Characteristic The method 500 continues to step 506 with the server 130 configured to determine the difference 450 between (i) user interactions of users with the digital items from the digital item group 350 having the old value for the item-characteristic, and (ii) user interactions of users with the digital items from the digital item group 350 having the new value for the item-characteristic.

It is contemplated that the server 130 may be configured to determine a difference between (i) user interactions, which occurred within a pre-determined interval of time, of users with the digital items from the digital item group 350 having the old value for the item-characteristic, and (ii) user interactions, which occurred within a pre-determined interval of time, of users with the digital items from the digital item group 350 having the new value for the item-characteristic.

Step 508: Comparing the Difference with a Threshold Value

The method continues to step 508 with the server 130 configured to compare the difference 450 with a threshold value. It should be noted that the threshold value may be pre-determined and expressed differently from what is exemplified herein as a person skilled in the art may understand after having appreciated the teachings disclosed herein.

For example, in response to the difference 450 being below the threshold value, the server 130 may determine that the new value of the item-characteristic received from the given network resource for the given digital item is accurate. In another example, in response to the difference 450 being above the threshold value, the server 130 may determine that the new value of the item-characteristic received from the given network resource for the given digital item is not accurate.

In yet another example, the threshold value may be an interval of values. In this case, in response to the difference 450 being within the interval of values, the server 130 may determine that the new value of the item-characteristic received from the given network resource for the given digital item is accurate.

In response to determining that the new value is not accurate, it is contemplated that the server 130 may be configured to trigger an action. In one case, for example, the server 130 may be configured to not replace the old value by the new value. In another case, the server 130 may be configured to notify the given network resource and/or the respective object provider that the new value provided thereto is not accurate. As such, the given network resource and/or the respective object provider may correct or transmit an indication of a corrected new value to the server 130.

In another example, in response to determining that the new value is not accurate the server 130 may be configured to provide to users the digital item with the new value of the given item-characteristic while also indicating the new value may be not accurate. As such, the users may be informed of that the new value may be inaccurately or erroneously provided by an object provider and/or the respective network resource.

As it can be appreciated from the above description, it is contemplated that the method 500 may comprise additional steps to those non-exhaustively listed above.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of notifying a network resource about accuracy of information associated with a digital item, the information to be used for updating a database, information about digital items provided to an e-platform by a plurality of network resources including the network resource, the e-platform having a plurality of users, the digital items being representative of objects provideable to the plurality of users, the e-platform being hosted on a server, the server being communicatively coupled with the database and the plurality of network resources over a communication network, the method executable by the server, the method comprising:

monitoring, by the server, user interactions between the plurality of users and a digital item group, the digital item group including digital items representative of a same product or service and provided to the e-platform by more than one network resources, the more than one network resources including the network resource;

receiving, by the server from the network resource, an indication of an updated value for an item-characteristic associated with the digital item, the digital item having been previously provided by the network resource to the e-platform with an old value of the item-characteristic, the digital item being part of the digital item group, the updated value for replacing the old value of the item-characteristic of the digital item;

updating an entry in the database associated with the digital item by replacing the old value by the updated value;

at a predetermined time after receiving the indication of the updated value, determining, by the server, an interaction difference between:

(i) user interactions of users with one or more digital items from the digital item group having a value for the item-characteristic corresponding to the old value, and (ii) user interactions of users with the digital item having the updated value for the item-characteristic; and comparing, by the server, the interaction difference with a threshold value for determining whether the updated value of the item-characteristic for the given digital item is accurate;

in response to the interaction difference being above the threshold: updating the entry in the database by re-assigning the old value to the digital item; and triggering transmission of a notification to the network resource indicative of that the updated value is inaccurate.

2. The method of claim 1, wherein the method further comprises: identifying, by the server, the digital items that are to be included in the digital item group.

3. The method of claim 2, wherein the identifying comprises: applying, by the server, a masking algorithm on values of at least one item-characteristic of digital items.

4. The method of claim 3, wherein the applying the masking algorithm comprises:

comparing, by the server, values of the at least one item-characteristic of digital items.

5. The method of claim 3, wherein the applying the masking algorithm comprises:

identifying, by the server, a set of digital items from the plurality of digital items that have same values of the at least one item-characteristic of digital items, the set of digital items to be included in the digital item group.

6. The method of claim 3, wherein the at least one item-characteristic is a name of digital item.

7. The method of claim 1, wherein the user interactions are of a given type of user interactions.

8. The method of claim 1, wherein the user interactions between users and digital items are a number of clicks performed by users on digital items.

9. The method of claim 8, wherein the user interactions between users and digital items are the number of clicks performed by users on digital items within a pre-determined time interval.

10. The method of claim 1, wherein the item-characteristic is a price of digital item.

11. The method of claim 1, wherein the method further comprises:

in response to the interaction difference being below the threshold value, determining that the updated value of the item-characteristic received from the network resource for the digital item is accurate.

12. The method of claim 1, wherein the threshold value is an interval of values, and wherein the method further comprises:

in response to the difference being within the interval of values, determining that the updated value of the item-characteristic received from the network resource for the digital item is accurate.

13. A server for notifying a network resource about accuracy of information associated with a digital item, the information to be used for updating a database, information about digital items provided to an e-platform by a plurality of network resources including the network resource, the e-platform having a plurality of users, the digital items being representative of objects provideable to the plurality of users, the e-platform being hosted on the server, the server being communicatively coupled with the database and the plurality of network resources over a communication network, the server including a hardware processor, the server being configured to:

monitor user interactions between the plurality of users and a digital item group, the digital item group including digital items representative of a same product or service and provided to the e-platform by more than one network resources, the more than one network resources including the network resource;

receive, from the network resource, an indication of an updated value for an item-characteristic associated with the digital item, the digital item having been previously provided by the network resource to the e-platform with an old value of the item-characteristic, the digital item being part of the digital item group, the updated value for replacing the old value of the item-characteristic of the digital item;

update an entry in the database associated with the digital item by replacing the old value by the updated value;

at a predetermined time after receiving the indication of the updated value, determine an interaction difference between:

(i) user interactions of users with one or more digital items from the digital item group having a value for the item-characteristic corresponding to the old value, and (ii) user interactions of users with the digital item having the updated value for the item-characteristic; and compare the interaction difference with a threshold value for determining whether the updated value of the item-characteristic for the given digital item is accurate;

in response to the interaction difference being above the threshold: update the entry in the database by re-assigning the old value to the digital item; and trigger transmission of a notification to the network resource indicative of that the updated value is inaccurate.

14. The server of claim 13, wherein the server is further configured to:

identify the digital items that are to be included in the digital item group.

15. The server of claim 14, wherein to identify comprises the server configured to:

apply a masking algorithm on values of at least one item-characteristic of digital items.

16. The server of claim 15, wherein to apply the masking algorithm comprises the server configured to:

compare values of the at least one item-characteristic of digital items.

17. The server of claim 15, wherein to apply the masking algorithm comprises the server configured to:

identify a set of digital items from the plurality of digital items that have same values of the at least one item-characteristic of digital items, the set of digital items to be included in the digital item group.

18. The server of claim 15, wherein the at least one item-characteristic is a name of digital item.

* * * * *